Figure 1:
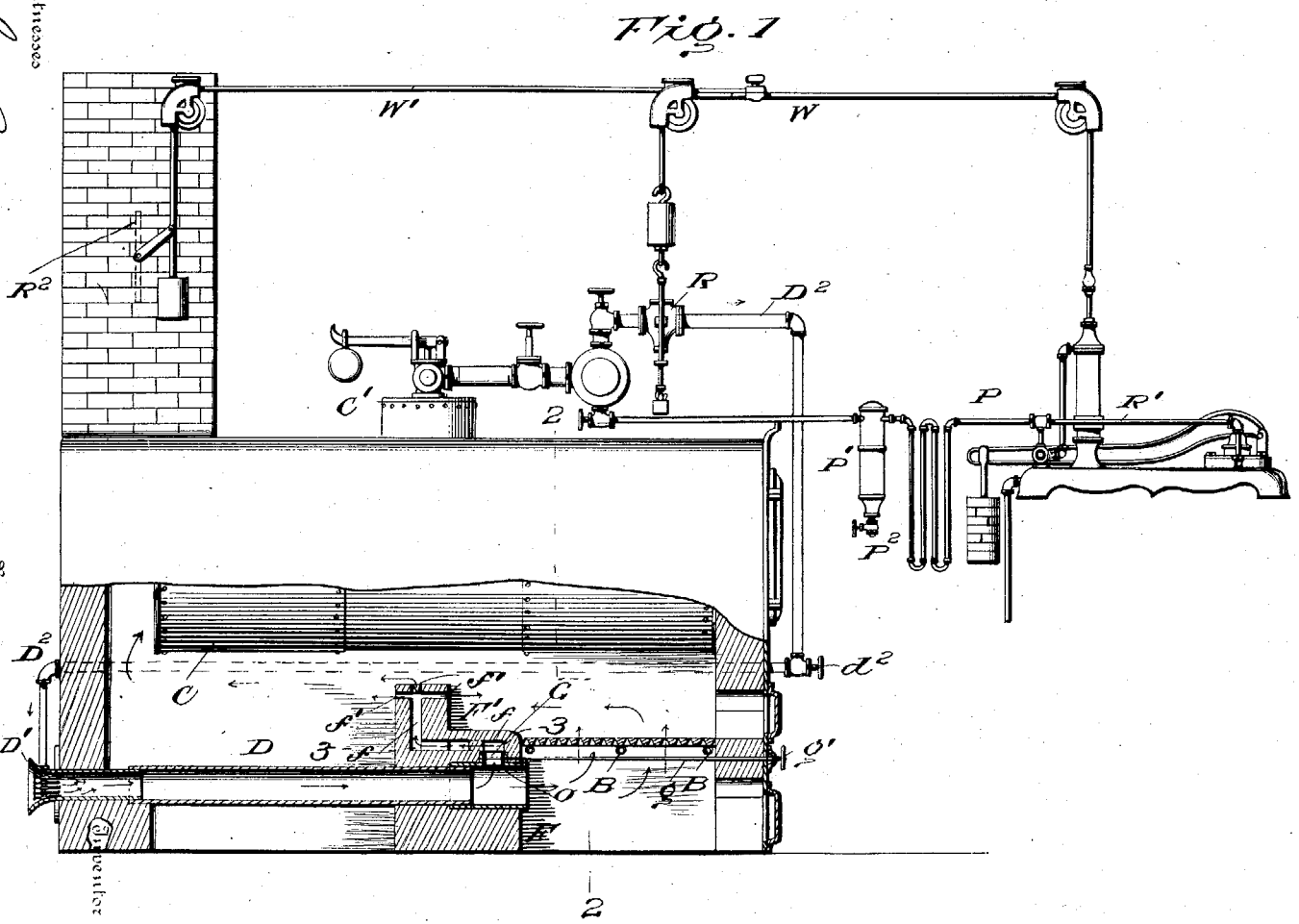

No. 12,072. REISSUED JAN. 6, 1903.

H. E. PARSON.

SMOKE CONSUMING FURNACE.

APPLICATION FILED MAR. 31, 1902.

2 SHEETS—SHEET 1.

Witnesses

Geo. Wm. Snyder Jr.

Inventor

By Henry E. Parson

Attorneys

No. 12,072. REISSUED JAN. 6, 1903.

H. E. PARSON.

SMOKE CONSUMING FURNACE.

APPLICATION FILED MAR. 31, 1902.

2 SHEETS—SHEET 2.

Inventor

Henry E. Parson

Witnesses

Geo. H. McSpadden Jr.

By Stewart & Stewart

Attorneys

UNITED STATES PATENT OFFICE.

HENRY E. PARSON, OF BROOKLYN, NEW YORK, ASSIGNOR, BY MESNE ASSIGNMENTS, TO PARSON MANUFACTURING COMPANY OF NEW YORK, A CORPORATION OF NEW YORK.

SMOKE-CONSUMING FURNACE.

SPECIFICATION forming part of Reissued Letters Patent No. 12,072, dated January 6, 1903.

Original No. 681,457, dated August 27, 1902. Application for reissue filed March 31, 1902. Serial No. 100,832.

*To all whom it may concern:*

Be it known that I, HENRY E. PARSON, a citizen of the United States, residing at Brooklyn, in the county of Kings and State of New York, have invented certain new and useful Improvements in Smoke-Consuming Furnaces; and I do hereby declare the following to be a full, clear, and exact description of the invention, such as will enable others skilled in the art to which it appertains to make and use the same.

This invention relates to certain improvements in furnaces of that kind in which a forced draft is applied to the coal on the grates while the fire and ash-pit doors are closed, so that the small-sized fuel-waste, known as "breeze-coal," can be successfully burned in such a manner that the more complete combustion is obtained and the objectionable formation of smoke is prevented.

The invention consists in the combination of elements by which the pressure of steam in the boiler is automatically maintained at a desired uniform degree. This is accomplished by maintaining the fire upon the grate by means of an automatically-controlled forced draft and at the same time supplying to the fire-chamber an automatically-regulated supply of air to accomplish complete combustion in the fire-chamber. The forced draft which delivers air below the grate and the auxiliary air-supply which delivers air into the fire-chamber above the grate coöperate and are both automatically controlled by the steam-pressure in the boiler, so that when the steam-pressure in the boiler falls below the desired degree the forced draft and supply of air below and above the grate will be automatically started, thus augmenting the fire and increasing the production of steam. When the steam-pressure in the boiler rises to the desired degree, the forced draft and supply of air to the fire-chamber will be checked and the temperature of the fire will decline. The automatic regulation of the supply of steam from the boiler by means of regulating the chimney-draft or regulating the area of a natural inlet-draft is old, and this I do not claim; but I believe it to be broadly new with me to automatically control a forced draft by the rise and fall of the steam-pressure in the boiler and to automatically control both the supply of air delivered below the grate and the supply of air delivered above the grate by the rise and fall of steam-pressure in the boiler.

The invention consists, further, of the combination, with a boiler-furnace having a grate, of a fire-bridge having a banking-platform in front, flues arranged in the upper part of the platform and the fire-bridge, outlet-openings in the top of the fire-bridge, a hot-air-blast pipe passing through the base portion of the fire-bridge and banking-platform and through the rear walls of the furnace, a steam-blower in the rear end of said blast-pipe, a suitable connection with the boiler for supplying steam to said blower, a damper located in an opening in the inner end of the blast-pipe adjacent to the ash-pit, and means for opening or closing said damper, said opening in the hot-air-blast pipe supplying the air to the flues and outlet-openings of the fire-bridge.

The invention consists, further, of certain details of construction and combinations of parts, which will be more fully described hereinafter, and finally claimed.

Figure 2:
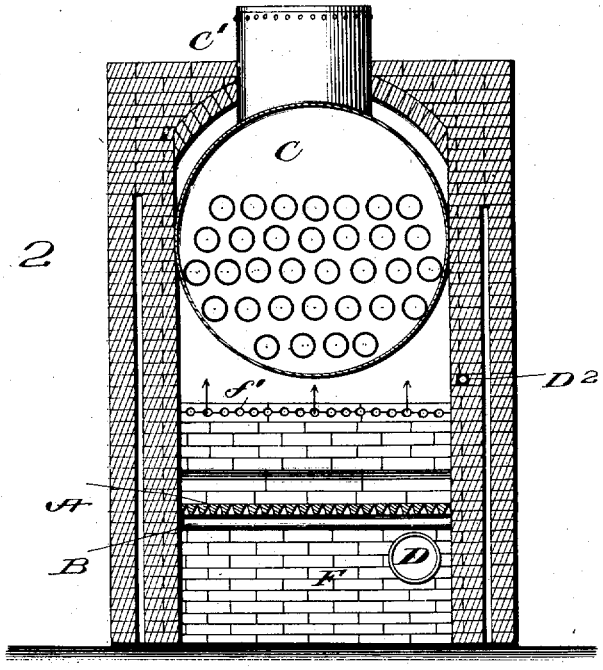
Figure 3:
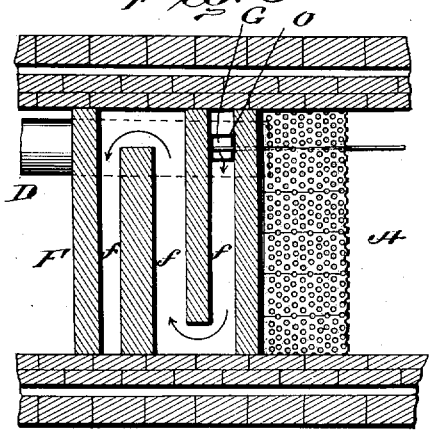

In the accompanying drawings, Figure 1 represents a vertical longitudinal section through my improved smoke-consuming furnace, the upper part of the boiler and the chimney being in side elevation, so as to show the connection and regulating device for the supply of steam to the blower; and Figs. 2 and 3 are respectively a vertical transverse section on line 2 2, Fig. 1, and a horizontal section on line 3 3, Fig. 1.

Similar letters of reference indicate corresponding parts.

Referring to the drawings, A represents the grate of my improved smoke-consuming furnace, which is preferably composed of a suitable number of grate-bars having conical perforations through which the hot-air blast is supplied to the fuel on the grate. The grate-bars are supported on tubular bearing-bars B, which extend transversely across the combustion-chamber of the furnace. The fire and ash-pit doors at the front of the furnace are kept tightly closed when the small-coal waste is burned on the grate.

Adjacent to the grate A is arranged the fire-bridge F and a banking-platform F′ in front of the same and behind the grate. The lower part or base of the fire-bridge and the banking-platform are connected by a hot-air-blast pipe D with the rear wall of the furnace, said pipe passing out through the rear wall and being provided at its outer end with a steam-blower D′, which is connected by a steam-supply pipe $D^2$ with the dome C′ of the boiler C. The front end of the hot-air-blast pipe D terminates in the ash-pit and supplies hot air under pressure to the ash-pit and from the same through the openings in the grate-bars to the fuel burning on the same. The steam-supply pipe $D^2$ is provided with a stop-cock $d^2$ at its front part in front of the front wall of the furnace for establishing a connection with the steam-dome C′ of the boiler or interrupting the same when no hot-air blast is required. The supply of steam to the blower is regulated automatically, so as to keep up the proper burning of the fuel on the grate by means of a regulating-valve R in the supply-pipe $D^2$, which regulating-valve is opened or closed more or less by a weighted connection with the blower and damper regulator R′, as shown in Fig. 1, said regulator being connected by a counterweighted wire rope W with the regulating-valve R and by a second counterweighted wire rope W′ with the damper $R^2$, located in the chimney of the furnace. The blower and damper regulator R′ is connected by a pipe P with the main steam-pipe of the boiler, a dirt-trap P′ and condensing-coil $P^2$ being located in said pipe P. The automatic regulation of the supply of steam from the boiler and of the regulating-valve and damper is well known; but the automatic regulation of the forced draft by the steam-pressure and the balance of the temperature of the fire against the steam-pressure I believe to be broadly new with me; but the mechanism is shown for the purpose of understanding the automatic regulation of the fire, as described later on. The supply-pipe $D^2$ is conducted through one of the side walls of the furnace and superheated, so as to form a superheater for the steam and air supplied to the blower of the blast-pipe.

In the banking-platform F′ and fire-bridge F are arranged heating-flues *f*, which extend from one side to the other of the banking-platform and in vertical direction through the fire-bridge, the fire-bridge flue communicating with rows of outlet-perforations *f′* in the front, top, and rear of the fire-bridge. The lower end of the heating-flue in the banking-platform F′ communicates with an opening *o* in the top of the hot-air-blast pipe D, through which opening hot air from the blast-pipe is conducted into the flues *f* of the banking-platform and fire-bridge, heated still more in its course through these flues, and is emitted in a highly-heated state through the perforations *f′* in the fire-bridge, so as to mingle with the gaseous products of combustion of the fuel on the grate and to enable them to burn in a very complete and effective manner. In the opening *o* in the top of the air-blast pipe, which opening is located near the inner end of the same, is arranged a damper G, which is opened or closed by means of an oscillatory damper-rod *g*, that passes through the front wall of the banking-platform and the front wall of the furnace, said rod being provided with a regulating-wheel *g′* or the like at its outer end, so as to permit the opening and closing of the damper, as required.

In grates for burning small-coal waste the ashes are not dropped into the ash-pit, but are drawn off through the front door of the fire-chamber, while the burning fuel is preferably banked up on the banking-platform F′ and returned to the grate after the ashes have been drawn off. It is necessary to supply hot-air blast to the fuel on the grate, so as to produce the complete combustion of the same. This blast has to be regulated, together with the steam-supply and the draft of the chimney, so as to produce a good fire on the grate. When the supply of hot air by the blower D′ is interrupted by closing the steam-supply pipe, only sufficient quantity of air is drawn off by the grate, so as to keep the fire alive when no steam is to be made. As soon as steam is to be made the hot-air blast is supplied to the grate, which is accomplished by opening the steam-supply pipe. The steam is then supplied to the blower D of the blast-pipe and through the same to the ash-pit, passing through the openings in the grate-bars, so as to produce the combustion of the fuel spread on the same. Simultaneously the hot-air blast passes into the flues *f* in the banking-platform and fire-bridge, so that the air is heated up to still higher temperature and emitted with the steam carried along and mixed with the gases of combustion that are conducted over the fire-bridge, so as to produce by the intermingling with the highly-heated products of combustion the thorough and effective combustion of the same. When the pressure of steam in the boiler rises, the blower and damper regulator R′ is called into action, so as to operate the regulating-valve in the supply-pipe $D^2$ and damper $R^2$ in the chimney, so that the supply of steam to the blower D′, as well as the draft in the chimney, is diminished. Consequently a smaller quantity of hot air is supplied to the fuel and fire-bridge. When the pressure of steam in the boiler falls below a certain limit, the regulator will again open the regulating-valve R, so as to supply a larger quantity of steam to the blower, grate, and fire-bridge, while the damper $R^2$ is opened again, so as to increase the draft of the furnace. During the supply of steam to the blower the damper G in the opening *o* in the blast-pipe D, by which opening the same is connected with the flues of the banking-platform and fire-bridge, has to be in open position. When it is desired to interrupt the supply of air to the flues of the banking-platform and fire-bridge, the damper G is closed, and thereby the connection of the heating-flues interrupted, in which case the supply of hot air to the grate is continued and the supply of air through the openings in the fire-bridge discontinued. This may be done when the steam has to be gradually discontinued. When, however, steam of high pressure and the generation of a large quantity of steam are desired, then the hot air is supplied to the grate-bar as well as to the flues in the banking-platform and fire-bridge, so that a quick and energetic combustion of the fuel and its gases takes place with little, if any, formation of smoke, owing to the complete combustion of the fuel and the products of combustion of the same. The automatic regulation of the steam supplied to the blower and of the draft permits the fireman to give his whole attention to the proper supply of fuel to the grate, so that he can keep up the fire without giving any attention to the steam-supply of the blower and draft of the furnace, which are automatically regulated by the blower and damper regulator. The furnace is greatly improved by the connection of the blast-pipe D with the grate and with the heating-flues *f* in the banking-platform and fire-bridge and the supply of fuel to the grate rendered easy and regular, so that thereby the burning of the cheap coal-waste in furnaces is facilitated and a great yield of steam at considerable less expense obtained, and at the same time the smoke passing out of the chimney is almost entirely prevented.

I have described a construction which I believe to be effective to carry my invention into practice; but I do not intend to limit myself to any particular structure, but to claim broadly the regulation of steam-pressure in the boiler by automatically increasing or decreasing the forced draft delivered below the grate or the forced draft delivered below the grate and above the grate by any form of mechanism capable of producing this result under the influence of the fluctuation of steam-pressure, the draft operating inversely as the steam-pressure.

Having thus described my invention, what I claim as new, and desire to secure by Letters Patent, is—

1. The combination with a closed combustion-chamber and ash-pit, of a grate, a banking-platform having air-channels, a bridge-wall having air-channels which communicate with the air-channels of the banking-platform and receive air from the region of the ash-pit, the channels of the bridge-wall delivering air to the fire-chamber, a hot-air-blast pipe arranged within the fire-chamber and heated thereby and delivering hot air under pressure to the ash-pit, a blower delivering air under pressure to the hot-air-blast pipe, and means for dividing the blast between the ash-pit and the fire-chamber.

2. The combination with a closed combustion-chamber and ash-pit, of a grate, a banking-platform having air-channels, a bridge-wall having air-channels which communicate with the channels of the banking-platform and receive air from the region of the ash-pit, the channels of the bridge-wall delivering air to the fire-chamber, a hot-air-blast pipe arranged within the fire-chamber, and heated thereby and delivering hot air under pressure to the ash-pit, a blower delivering air under pressure to the hot-air-blast pipe, means controlled by the boiler-pressure for automatically regulating the force of the said blower, and means for dividing the blast between the ash-pit and the fire-chamber.

3. The combination with a closed combustion-chamber and ash-pit, of a grate, a banking-platform having air-channels, a bridge-wall having air-channels which communicate with the channels of the banking-platform and receive air from the region of the ash-pit, the channels of the bridge-wall delivering air to the fire-chamber, a hot-air-blast pipe arranged within the fire-chamber and heated thereby and delivering hot air under pressure to the ash-pit, a steam-injector blower delivering air under pressure to the hot-air-blast pipe, and means controlled by the boiler-pressure for automatically controlling the steam supplied to the injector, and means for dividing the blast between the ash-pit and the fire-chamber.

4. The combination, with a closed combustion-chamber and ash-pit, of a grate, a banking-platform and fire-bridge, a hot-air-blast pipe extending through the rear wall of the furnace and the base of the fire-bridge and banking-platform into the ash-pit, a steam-blower in said hot-air-blast pipe, a steam-supply pipe connecting the dome of the boiler with the blower, heating-flues in the banking-platform and fire-bridge, outlet-openings in the top of the fire-bridge, for the heated air, an opening in the hot-air-blast pipe communicating with the flue in the banking-platform, and a damper for opening or closing said hot-air-supply opening in the blast-pipe, substantially as set forth.

5. The combination, of a combustion-chamber and ash-pit having closed doors, a grate in said combustion-chamber, a banking-platform and fire-bridge adjacent to said grate, a hot-air-blast pipe extending through the rear wall of the furnace and through the base of the banking-platform and fire-bridge into the ash-pit, a steam-blower at the rear end of the hot-air-blast pipe, a steam-supply pipe connecting the blower with the dome of the boiler, a regulating-valve in said steam-supply pipe, an automatic regulator for operating the valve, a damper in the chimney of the furnace, also connected with the regulator for being automatically operated jointly with the regulating-valve, flues in the banking-platform and fire-bridge, outlet-openings in the top of the fire-bridge, an opening near the inner end of the hot-air-blast pipe communicating with the end of the hot-air flue in the banking-platform, a damper in said supply-opening of the blast-pipe, and means for opening or closing said damper from the outside of the furnace, substantially as set forth.

In testimony that I claim the foregoing as my invention I have signed my name in presence of two subscribing witnesses.

HENRY E. PARSON.

Witnesses:

SIDNEY R. PERRY,

EMMA W. FINLAYSON.